US012288506B2

(12) United States Patent
Pyun et al.

(10) Patent No.: US 12,288,506 B2
(45) Date of Patent: Apr. 29, 2025

(54) DISPLAY DEVICE AND METHOD OF DRIVING THE SAME

(71) Applicant: SAMSUNG DISPLAY CO., LTD., Yongin-si (KR)

(72) Inventors: Ki Hyun Pyun, Yongin-si (KR); Won Jin Seo, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 4 days.

(21) Appl. No.: 18/133,998

(22) Filed: Apr. 12, 2023

(65) Prior Publication Data

US 2023/0419881 A1 Dec. 28, 2023

(30) Foreign Application Priority Data

Jun. 28, 2022 (KR) ........................ 10-2022-0079125

(51) Int. Cl.
*G09G 3/3275* (2016.01)
*G09G 3/32* (2016.01)

(52) U.S. Cl.
CPC ......... *G09G 3/32* (2013.01); *G09G 2310/027* (2013.01); *G09G 2320/041* (2013.01)

(58) Field of Classification Search
CPC ............... G09G 3/32; G09G 2310/027; G09G 2320/041; G09G 5/10; G09G 2320/0271; G09G 2320/029; G09G 2320/045; G09G 2320/0626; G09G 3/3233; G09G 3/3648; G09G 2320/0233
See application file for complete search history.

(56) References Cited

U.S. PATENT DOCUMENTS

| | | | | |
|---|---|---|---|---|
| 8,558,767 B2 * | 10/2013 | Kwon | G09G 3/3233 | 315/169.3 |
| 9,041,626 B2 * | 5/2015 | Park | G09G 3/3233 | 345/82 |
| 11,663,973 B1 * | 5/2023 | Tan | G09G 3/32 | 345/690 |
| 2003/0189558 A1 * | 10/2003 | Aoki | H04N 5/20 | 348/E5.073 |
| 2014/0198091 A1 * | 7/2014 | Shin | G09G 3/3291 | 345/82 |

(Continued)

FOREIGN PATENT DOCUMENTS

| | | |
|---|---|---|
| KR | 100639005 B1 | 10/2006 |
| KR | 100893482 B1 | 4/2009 |
| KR | 100894606 B1 | 4/2009 |

*Primary Examiner* — Jose R Soto Lopez
(74) *Attorney, Agent, or Firm* — CANTOR COLBURN LLP

(57) ABSTRACT

A display device of the disclosure includes a grayscale converter which converts input grayscales into output grayscales based on a scale factor, a data driver which converts the output grayscales into data voltages, a plurality of pixels which receives the data voltages and displays an image based on the data voltages, and a current sensor which provides a sensing current by sensing a first power current supplied to the plurality of pixels to display the image. When a load corresponding to the input grayscales is greater than a minimum load, the grayscale converter adjusts a change amount of the scale factor based on a current difference between a target current corresponding to the load and the sensing current.

16 Claims, 14 Drawing Sheets

(56) References Cited

U.S. PATENT DOCUMENTS

| | | | | |
|---|---|---|---|---|
| 2016/0113085 | A1* | 4/2016 | Väänänen | G09G 3/2085 315/185 R |
| 2016/0155382 | A1* | 6/2016 | Cheon | G09G 3/3258 345/76 |
| 2016/0195772 | A1* | 7/2016 | Lee | G09G 3/03 349/61 |
| 2016/0293101 | A1* | 10/2016 | Jeong | G09G 3/3258 |
| 2017/0039953 | A1* | 2/2017 | Lee | G09G 3/3233 |
| 2019/0279579 | A1* | 9/2019 | Chappalli | G09G 3/3406 |
| 2019/0362671 | A1* | 11/2019 | Kuki | G09G 3/2007 |
| 2020/0152154 | A1* | 5/2020 | Chu | G09G 3/2003 |
| 2021/0012704 | A1* | 1/2021 | Pyun | G09G 3/3233 |
| 2021/0012712 | A1* | 1/2021 | Lin | G09G 3/3291 |
| 2021/0020098 | A1* | 1/2021 | Yum | G09G 3/3208 |
| 2021/0248943 | A1* | 8/2021 | Kim | G09G 3/20 |
| 2021/0248975 | A1* | 8/2021 | Zhai | G09G 5/10 |
| 2022/0172673 | A1* | 6/2022 | Li | H01L 25/167 |
| 2022/0262307 | A1* | 8/2022 | Pyun | G09G 3/3258 |
| 2023/0122681 | A1* | 4/2023 | Park | G09G 3/3291 345/690 |
| 2023/0138364 | A1* | 5/2023 | Jun | G09G 3/2092 345/690 |
| 2023/0162668 | A1* | 5/2023 | Zen | G09G 3/3208 345/690 |

* cited by examiner

<DISPLAY PERIOD>

<THRESHOLD VOLTAGE SENSING PERIOD>

<DIODE VOLTAGE SENSING PERIOD>

DISPLAY DEVICE AND METHOD OF DRIVING THE SAME

This application claims priority to Korean Patent Application No. 10-2022-0079125, filed on, Jun. 28, 2022, and all the benefits accruing therefrom under 35 U.S.C. § 119, the content of which in its entirety is herein incorporated by reference.

BACKGROUND

1. Field

The disclosure relates to a display device and a method of driving the display device.

2. Description of the Related Art

As an information technology is developed, importance of a display device, which is a connection medium between a user and information, is emphasized. Accordingly, use of a display device such as a liquid crystal display device, and an organic light emitting display device is increasing.

SUMMARY

A display device may display an image using a plurality of pixels. When a temperature of the display device is high, a drain-source current characteristic with respect to a gate-source voltage of driving transistors of pixels may vary. At this time, a current flowing through the driving transistors may increase more than expected. The current increased more than expected may occur a problem that a luminance of an image is increased image quality is distorted.

Embodiments of the invention provide a display device and a method of driving the display device capable of preventing a luminance change and image quality distortion even with respect to various temperature conditions and a worst pattern.

According to an embodiment of the disclosure, a display device includes a grayscale converter which converts input grayscales into output grayscales based on a scale factor, a data driver which converts the output grayscales into data voltages, a plurality of pixels which receives the data voltages and displays an image based on the data voltages, and a current sensor which provides a sensing current by sensing a first power current supplied to the plurality of pixels to display the image. In such an embodiment, when a load corresponding to the input grayscales is greater than a minimum load, the grayscale converter adjusts a change amount of the scale factor based on a current difference between a target current corresponding to the load and the sensing current.

In an embodiment, when the load is greater than the minimum load, the grayscale converter may adjust the change amount of the scale factor to be increased as the current difference increases.

In an embodiment, when the load is greater than the minimum load, the grayscale converter may adjust the change amount of the scale factor corresponding to the current difference to be increased as the load increases.

In an embodiment, the display device may further include a temperature sensor which provides a sensing temperature, and when the load is greater than the minimum load, and the grayscale converter may adjust the change amount of the scale factor corresponding to the current difference to be increased as the sensing temperature increases.

In an embodiment, when the load is less than the minimum load, the grayscale converter may adjust the change amount of the scale factor corresponding to a time to be increased as the sensing temperature increases.

In an embodiment, the grayscale converter may include a load calculator which calculates the load corresponding to a sum of the input grayscales.

In an embodiment, the grayscale converter may include a target current calculator which provides the target current corresponding to the load, and the target current is less than or equal to a limit current.

In an embodiment, the grayscale converter may include a comparator which receives the target current and the sensing current and outputs the current difference.

In an embodiment, the display device may further include a temperature sensor which provides a sensing temperature, and the grayscale converter may further include a first change amount calculator which calculates a first change amount with respect to the scale factor based on the current difference, the load, and the sensing temperature.

In an embodiment, the grayscale converter may further include a second change amount calculator which calculates a second change amount with respect to the scale factor based on the load and the sensing temperature, when the load is less than the minimum load.

In an embodiment, the grayscale converter may further include a change amount selector which selects the first change amount as the change amount when the load is greater than the minimum load, and selects the second change amount as the change amount when the load is less than the minimum load.

In an embodiment, the grayscale converter may further include a scale factor application unit which generates the output grayscales by applying the scale factor, to which the change amount is applied, to the input grayscales.

According to an embodiment of the disclosure, a method of driving a display device includes converting input grayscales into output grayscales based on a scale factor, converting the output grayscales into data voltages, displaying an image based on the data voltages, and providing a sensing current by sensing a first power current supplied to a plurality of pixels of the display device to display the image, and the converting the input grayscales into the output grayscales includes adjusting a change amount of the scale factor based on a current difference between a target current corresponding to a load and the sensing current when the load corresponding to the input grayscales is greater than a minimum load.

In an embodiment, the adjusting the change amount of the scale factor may include adjusting the change amount of the scale factor to be increased as the current difference increases when the load is greater than the minimum load.

In an embodiment, the adjusting the change amount of the scale factor may further include adjusting the change amount of the scale factor corresponding to the current difference to be increased as the load increases when the load is greater than the minimum load.

In an embodiment, the adjusting the change amount of the scale factor may further include adjusting the change amount of the scale factor corresponding to the current difference to be increased as a sensing temperature increases when the load is greater than the minimum load.

In an embodiment, the adjusting the change amount of the scale factor may further include adjusting the change amount of the scale factor corresponding to a time to be increased as the sensing temperature increases when the load is less than the minimum load.

In an embodiment, the load may correspond to a sum of the input grayscales.

In an embodiment, the target current may be less than or equal to a limit current.

In an embodiment, the adjusting the change amount of the scale factor may include selecting a first change amount as the change amount when the load is greater than the minimum load, and selecting a second change amount different from the first change amount as the change amount when the load is less than the minimum load.

Embodiments of a display device and a method of driving the display device may prevent a luminance change and image quality distortion even with respect to various temperature conditions and a worst pattern.

BRIEF DESCRIPTION OF THE DRAWINGS

The above and other features of the invention will become more apparent by describing in further detail embodiments thereof with reference to the accompanying drawings, in which.

DETAILED DESCRIPTION

Figure 1:
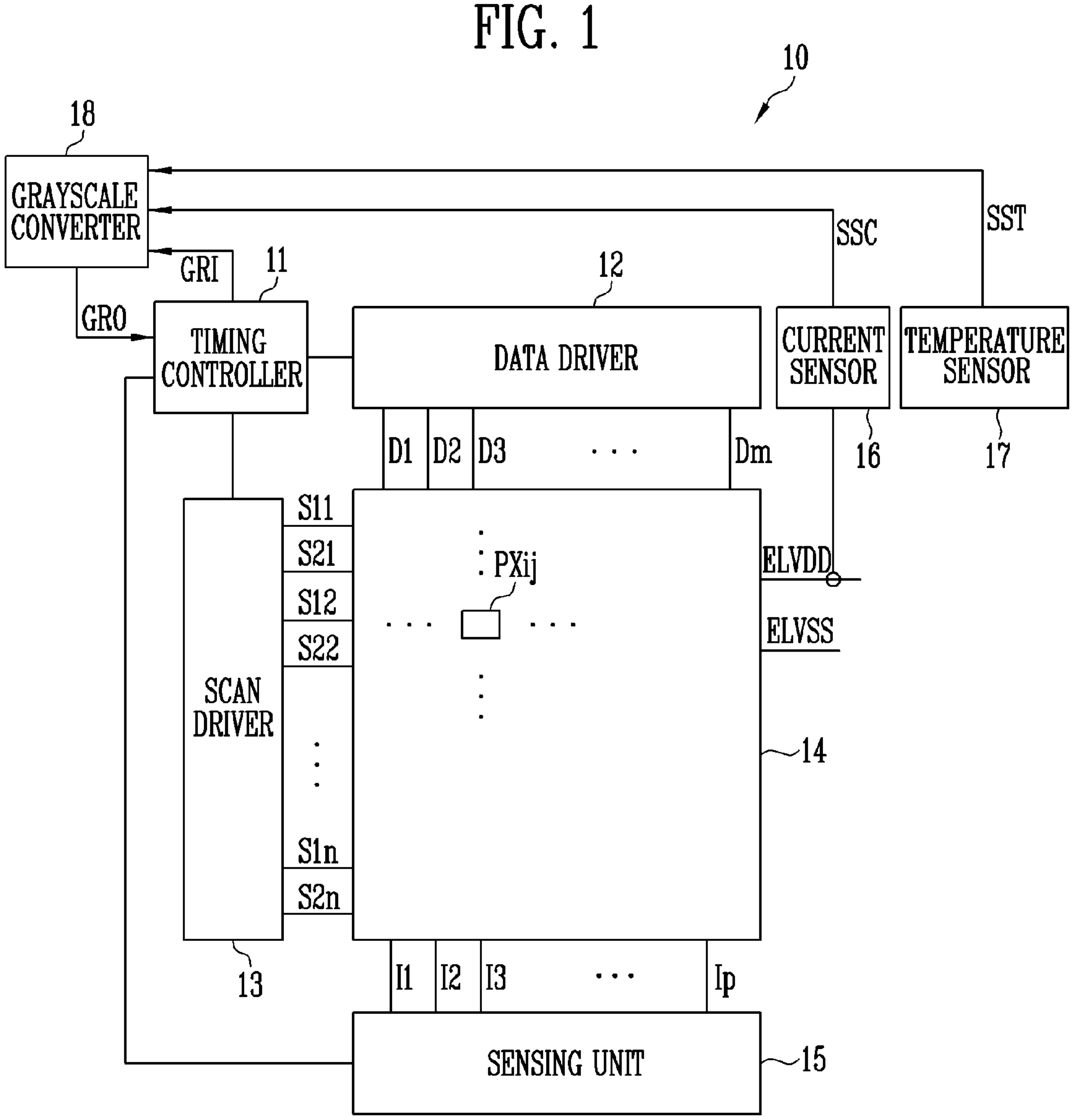
FIG. 1 is a diagram illustrating a display device according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In order to clearly describe the disclosure, parts that are not related to the description are omitted, and the same or similar elements are denoted by the same reference numerals throughout the specification. Therefore, the above-described reference numerals may be used in other drawings.

In addition, sizes and thicknesses of each component shown in the drawings are arbitrarily shown for convenience of description, and thus the disclosure is not necessarily limited to those shown in the drawings. In the drawings, thicknesses may be exaggerated to clearly express various layers and areas.

In addition, an expression "is the same" in the description may mean "is substantially the same". That is, the expression "is the same" may be the same enough for those of ordinary skill to understand that it is the same. Other expressions may also be expressions in which "substantially" is omitted.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

FIG. 1 is a diagram illustrating a display device according to an embodiment of the disclosure.

Referring to FIG. 1, the display device 10 according to an embodiment may include a timing controller 11, a data driver 12, a scan driver 13, a pixel unit 14, a sensing unit 15, a current sensor 16, a temperature sensor 17, and a grayscale converter 18.

The timing controller 11 may receive input grayscales GRI for each frame (for example, an image frame) and control signals from a processor. Here, the processor may correspond to at least one selected from a graphics processing unit (GPU), a central processing unit (CPU), an application processor (AP), and the like. The timing controller 11 may provide output grayscales GRO converted from the received input grayscales GRI to the data driver 12. In addition, the timing controller 11 may provide control signals suitable for specifications of each of the data driver 12, the scan driver 13, and the sensing unit 15.

In a display period, the data driver 12 may generate data voltages to be provided to data lines D1, D2, D3, . . . , and Dm using the output grayscales GRO and the control signals received from the timing controller 11. In an embodiment, for example, the data driver 12 may sample the output grayscales GRO using a clock signal and convert the sampled output grayscales GRO into the data voltages. The data driver 12 may apply the data voltages to the data lines D1 to Dm in a pixel row unit. Here, m may be an integer greater than 0. Here, a pixel row means pixels connected to the same scan lines. In a sensing period, the data driver 12 may supply reference voltages to the data lines D1 to Dm.

The scan driver 13 may receive a clock signal, a scan start signal, or the like from the timing controller 11, and generate first scan signals to be provided to first scan lines S11, S12, . . . , and S1*n* and second scan signals to be provided to second scan lines S21, S22, . . . , and S2*n*. Here, n may be an integer greater than 0.

In an embodiment, for example, the scan driver 13 may sequentially supply first scan signals having a turn-on level of pulse to the first scan lines S11 to S1*n*. In addition, the scan driver 13 may sequentially supply second scan signals having a turn-on level of pulse to the second scan lines S21 to S2*n*. In an embodiment, for example, the scan driver 13 may include a first scan driver connected to the first scan lines S11, S12, and Sin and a second scan driver connected to the second scan lines S21, S22, and S2*n*. Each of the first scan driver and the second scan driver may include scan stages configured in a form of a shift register. Each of the first scan driver and the second scan driver may generate scan signals by sequentially transferring a scan start signal having a form of a turn-on level of pulse to a next scan stage according to control of a clock signal.

In the display period, the sensing unit 15 may supply an initialization voltage to sensing lines I1, I2, I3, . . . , and Ip. Here, p may be an integer greater than 0. In a sensing period, the sensing unit 15 may receive sensing voltages from the sensing lines I1 to Ip connected to pixels.

The sensing unit 15 may include sensing channels connected to the sensing lines I1 to Ip. In an embodiment, for example, the sensing lines I1 to Ip and the sensing channels may correspond to each other in a one-to-one manner. In an embodiment, for example, the number of sensing lines I1 to Ip and the number of sensing channels may be the same as each other. In an alternative embodiment, the number of sensing channels may be less than the number of sensing lines I1 to Ip. In such an embodiment, the sensing unit 15 may further include demultiplexers to sense the pixels in a time-division method.

The pixel unit 14 includes the pixels. The pixels may receive the data voltages to display an image. Each pixel PXij may be connected to a corresponding data line, a corresponding scan line, and a corresponding sensing line. Each of the pixels may be connected to a first power line ELVDD and a second power line ELVSS. In an embodiment, for example, during the display period, a voltage of the first power line ELVDD may be greater than a voltage of the second power line ELVSS.

The current sensor 16 may sense a first power current supplied to a plurality of pixels to display an image and provide a sensing current SSC. The first power current is a current flowing from the first power line ELVDD to the second power line ELVSS. The first power line ELVDD may be commonly connected to the plurality of pixels, and the second power line ELVSS may also be commonly connected to the plurality of pixels. In the display period, in each of the plurality of pixels, a driving current corresponding to each data voltage is branched (divided) from the first power supply current, and each of the plurality of pixels emits light with a luminance corresponding to respective driving currents. The branched currents flow back into the second power line ELVSS. In an embodiment, for example, a magnitude of the first power current may be equal to a sum of the driving currents flowing through the plurality of pixels. In an embodiment, as shown in FIG. 1, the current sensor 16 is connected to the first power line ELVDD. In an alternative embodiment, the current sensor 16 may be connected to the second power line ELVSS.

The temperature sensor 17 may provide a sensing temperature SST. In an embodiment, for example, the temperature sensor 17 may not sense a temperature of each pixel PXij, may sense an ambient temperature, and may provide the sensing temperature SST having a value corresponding to the ambient temperature.

The grayscale converter 18 may convert the input grayscales GRI into the output grayscales GRO based on a scale factor. The grayscale converter 18 may receive the input grayscales GRI from the timing controller 11, convert the input grayscales GRI into the output grayscales GRO, and provide the output grayscales GRO to the timing controller 11. According to an embodiment, the grayscale converter 18 and the timing controller 11 may be configured as (or defined by) one integrated chip (IC). According to an embodiment, the grayscale converter 18, the timing controller 11, and the data driver 12 may be configured as one IC. According to an embodiment, the grayscale converter 18, the timing controller 11, the data driver 12, and the sensing unit 15 may be configured as one IC. As described above, since various modifications by separating and integrating each of functional units shown in FIG. 1 would be well understood by those skilled in the art, any detailed description thereof will be omitted.

Based on a same input grayscales GRI, when the scale factor increases, the output grayscales GRO may increase, and when the scale factor decreases, the output grayscales GRO may decrease. When the output grayscales GRO increase, a luminance of the pixel unit 14 may increase, and when the output grayscales GRO decrease, the luminance of the pixel unit 14 may decrease.

In an embodiment, for example, when the sensing current SSC is excessively high compared to a load corresponding to the input grayscales GRI, the grayscale converter 18 may sense that the display device 10 display an image with an abnormal luminance, and decrease the scale factor. Therefore, the display device 10 may display the image again with a normal luminance.

When the load corresponding to the input grayscales GRI is greater than a minimum load, the grayscale converter 18 may adjust a change amount of the scale factor based on a current difference between a target current corresponding to the load and the sensing current SSC. In an embodiment, when the load is greater than the minimum load, the grayscale converter 18 may adjust the change amount of the scale factor to be increased as the current difference increases. Here, a magnitude of the change amount is described based on an absolute value, and such a description is omitted below. In an embodiment, when the load is greater than the minimum load, the grayscale converter 18 may adjust the change amount of the scale factor corresponding to the current difference to be increased as the load increases.

In an embodiment, when the load is greater than the minimum load, the grayscale converter 18 may adjust the change amount of the scale factor corresponding to the current difference to be increased as the sensing temperature SST increases. In an embodiment, when the load is less than the minimum load, the grayscale converter 18 may adjust the change amount of the scale factor corresponding to a time to be increased as the sensing temperature SST increases. An operation of the grayscale converter 18 will be described later in greater detail with reference to FIG. 7 or subsequent figures.

Figure 2:
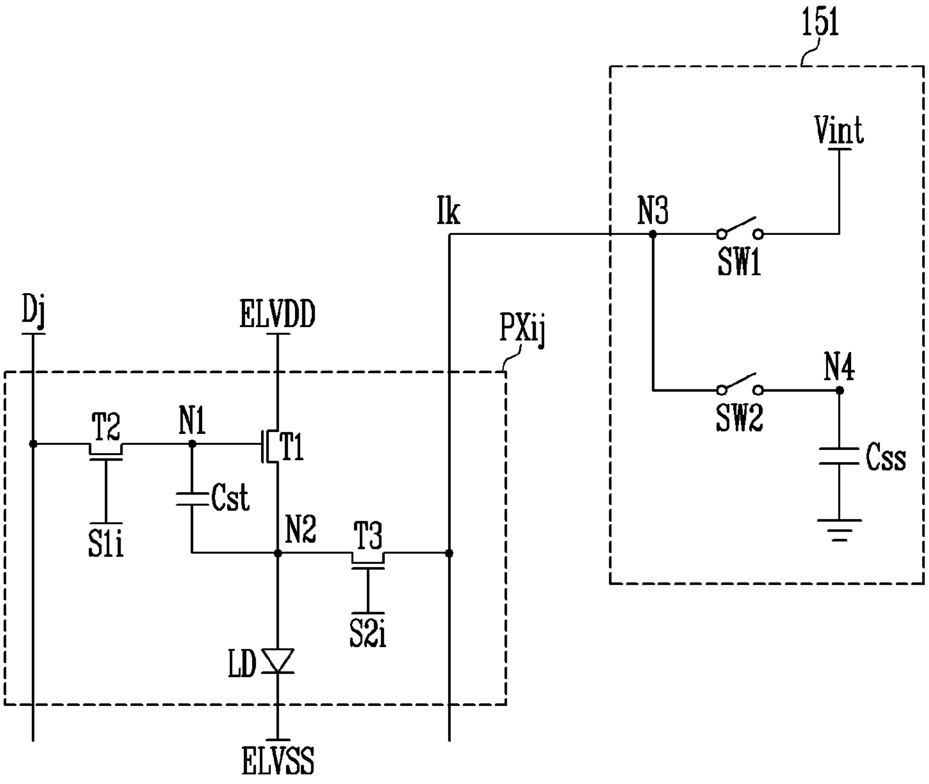
FIG. 2 is a diagram illustrating a pixel and a sensing channel according to an embodiment of the disclosure.

FIG. 2 is a diagram illustrating a pixel and a sensing channel according to an embodiment of the disclosure.

The pixel PXij may include transistors T1, T2, and T3, a storage capacitor Cst, and a light emitting diode LD.

In an embodiment, the transistors T1, T2, and T3 may be configured as N-type transistors. In an alternative embodiment, the transistors T1, T2, and T3 may be configured as P-type transistors. In another alternative embodiment, the transistors T1, T2, and T3 may be configured as a combination of an N-type transistor and a P-type transistor. The P-type transistor collectively refers to a transistor in which an amount of conducting current increases when a voltage difference between a gate electrode and a source electrode increases in a negative direction. The N-type transistor collectively refers to a transistor in which an amount of conducting current increases when a voltage difference between a gate electrode and a source electrode increases in a positive direction. In such an embodiment, each transistor may be configured in various forms such as a thin film transistor (TFT), a field effect transistor (FET), and a bipolar junction transistor (BJT).

The first transistor T1 may have a gate electrode connected to a first node N1, a first electrode connected to the first power line ELVDD, and a second electrode connected to a second node N2. The first transistor T1 may be referred to as a driving transistor.

The second transistor T2 may have a gate electrode connected to a first scan line S1*i*, a first electrode connected to a data line Dj, and a second electrode connected to the first node N1. The second transistor T2 may be referred to as a scan transistor.

The third transistor T3 may have a gate electrode connected to a second scan line S2*i*, a first electrode connected to the second node N2, and a second electrode connected to a sensing line Ik. The third transistor T3 may be referred to as a sensing transistor.

The storage capacitor Cst may have a first electrode connected to the first node N1 and a second electrode connected to the second node N2.

The light emitting diode LD may have an anode connected to the second node N2 and a cathode connected to the second power line ELVSS.

In general, the voltage of the first power line ELVDD may be greater than the voltage of the second power line ELVSS. In an embodiment, the voltage of the second power line ELVSS may be selectively set higher than the voltage of the first power line ELVDD for preventing the light emitting diode LD from emitting light.

The sensing channel 151 may include a first switch SW1, a second switch SW2, and a sensing capacitor Css.

A first electrode of the first switch SW1 may be connected to a third node N3. In an embodiment, for example, the third node N3 may correspond to the sensing line Ik. A second electrode of the first switch SW1 may receive an initialization voltage Vint. In an embodiment, for example, the second electrode of the first switch SW1 may be connected to initialization power supplying the initialization voltage Vint.

A first electrode of the second switch SW2 may be connected to the third node N3, and a second electrode of the second switch SW2 may be connected to a fourth node N4.

A first electrode of the sensing capacitor Css may be connected to the fourth node N4, and a second electrode of the sensing capacitor Css may be connected to reference power (for example, ground).

Although not shown, the sensing unit 15 may include an analog-to-digital converter. In an embodiment, for example, the sensing unit 15 may include analog-to-digital converters, the number of which is corresponding to (or the same as) the number of sensing channels. The analog-to-digital converter may convert a sensing voltage stored in the sensing capacitor Css into a digital value. The converted digital value may be provided to the timing controller 11. In an alternative embodiment, for example, the sensing unit 15 may include analog-to-digital converters, the number of which is less than that of the sensing channels, and the analog-to-digital converters may convert sensing signals stored in the sensing channels in a time-division method.

Figure 3:
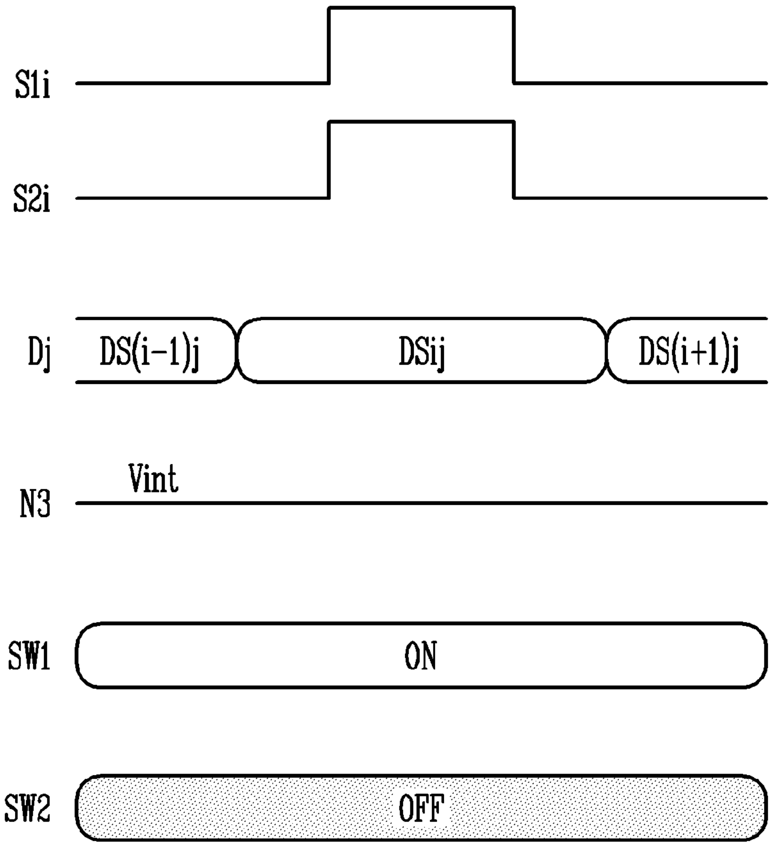
FIG. 3 is a diagram illustrating a display period according to an embodiment of the disclosure.

FIG. 3 is a diagram illustrating a display period according to an embodiment of the disclosure.

Referring to FIG. 3, during the display period, the sensing line Ik, that is, the third node N3, may receive the initialization voltage Vint. During the display period, the first switch SW1 may be in a turn-on state, and the second switch SW2 may be in a turn-off state.

During the display period, data voltages DS(i−1)j, DSij, and DS(i+1)j may be sequentially applied to the data line Dj in a horizontal period unit. A turn-on level (for example, a logic high level) of first scan signal (i.e., the first scan signal having a turn-on level) may be applied to a first scan line S1*i* in a corresponding horizontal period. In addition, in synchronization with the first scan line S1*i*, a turn-on level of second scan signal may also be applied to a second scan line S2*i*. In an alternative embodiment, during the display period, the second scan line S2*i* may always be in a state in which the turn-on level of second scan signal is applied.

In an embodiment, for example, when the turn-on level of scan signals is applied to the first scan line S1*i* and the second scan line S2*i*, the second transistor T2 and the third transistor T3 may be in a turn-on state. Therefore, a voltage corresponding to a difference between the data voltage DSij and the initialization voltage Vint is written in the storage capacitor Cst of the pixel PXij.

In the pixel PXij, a driving current amount flowing through a driving path connecting the first power line ELVDD, the first transistor T1, the light emitting diode LD, and the second power line ELVSS is determined based on a voltage difference between a gate electrode and a source electrode of the first transistor T1. An emission luminance of the light emitting diode LD may be determined to correspond to the driving current amount.

Thereafter, when a turn-off level (for example, a logic low level) of scan signal is applied to the first scan line S1*i* and the second scan line S2*i*, the second transistor T2 and the third transistor T3 may be in a turn-off state. Therefore, regardless of a voltage change of the data line Dj, the voltage difference between the gate electrode and the source electrode of the first transistor T1 may be maintained by the storage capacitor Cst, and the emission luminance of the light emitting diode LD may be maintained.

Figure 4:
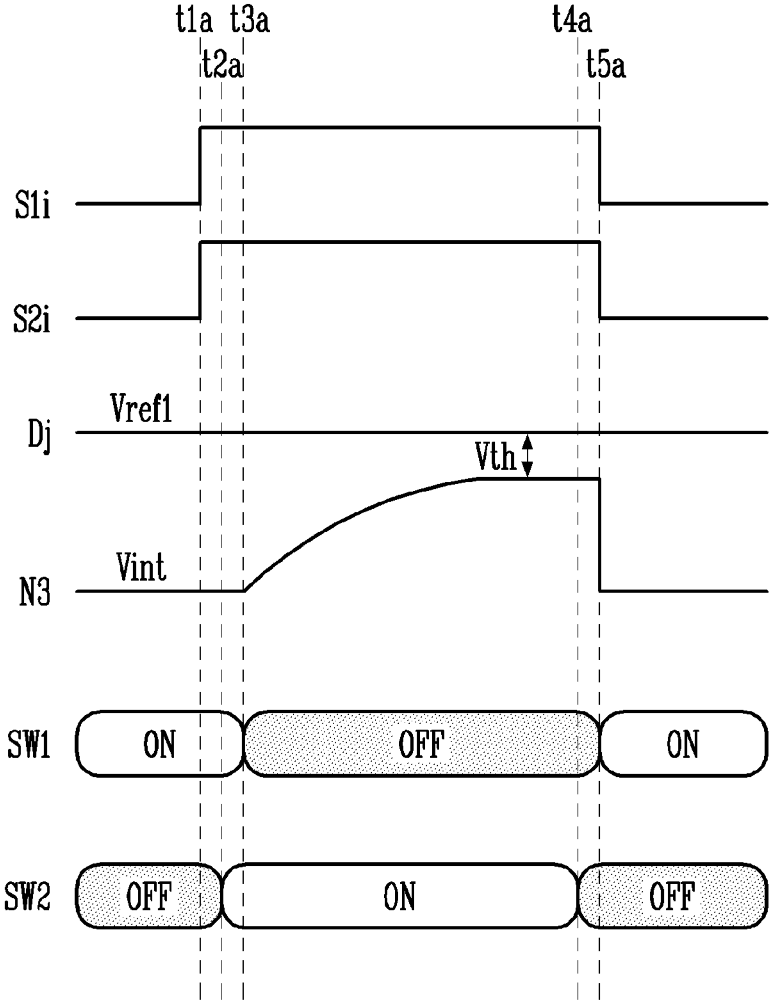
FIG. 4 is a diagram illustrating a threshold voltage sensing period of a transistor according to an embodiment of the disclosure.

FIG. 4 is a diagram illustrating a threshold voltage sensing period of a transistor according to an embodiment of the disclosure.

Before a first time point t1*a* in the threshold voltage sensing period, the first switch SW1 may be in a turn-on state, and the second switch SW2 may be in a turn-off state. Therefore, the initialization voltage Vint may be applied to the third node N3, and the data driver 12 may supply a first reference voltage Vref1 to the data line Dj.

At the first time point t1*a*, the turn-on level of first scan signal may be supplied to the first scan line S1*i*, and the turn-on level of second scan signal may be supplied to the second scan line S2*i*. Accordingly, the first reference voltage Vref1 may be applied to the first node N1, and the initialization voltage Vint may be applied to the second node N2. Accordingly, the first transistor T1 may be turned on in response to a difference between a gate voltage and a source voltage.

At a second time point t2*a* in the threshold voltage sensing period, the second switch SW2 may be turned on. Accordingly, the first electrode of the sensing capacitor Css may be initialized to the initialization voltage Vint.

At a third time point t3*a* in the threshold voltage sensing period, the first switch SW1 may be turned off. Accordingly, as a current is supplied from the first power line ELVDD, a voltage of the second node N2 and the third node N3 may increase. When the voltage of the second node N2 and the third node N3 increases to a voltage (Vref1-Vth), the first transistor T1 is turned off, and thus the voltage of the second node N2 and the third node N3 does not increase any more. Since the fourth node N4 is connected to the third node N3 through the turned on second switch SW2, a sensing voltage (Vref1-Vth) is stored in the first electrode of the sensing capacitor Css.

At a fourth time point t4*a* in the threshold voltage sensing period, the second switch SW2 may be turned off, and thus the sensing voltage (Vref1-Vth) of the first electrode of the sensing capacitor Css may be maintained. The sensing unit 15 may perform analog-to-digital conversion of the sensing voltages (Vref1-Vth), and thus may determine a threshold voltage (Vth) of the first transistor T1 of the pixel PXij.

At a fifth time point t5*a* in the threshold voltage sensing period, the turn-off level of first scan signal may be supplied to the first scan line S1*i*, and a turn-off level of second scan signal may be supplied to the second scan line S2*i*. In addition, at the fifth time point t5*a*, the first switch SW1 may be turned on. Accordingly, the initialization voltage Vint may be applied to the third node N3.

Figure 5:
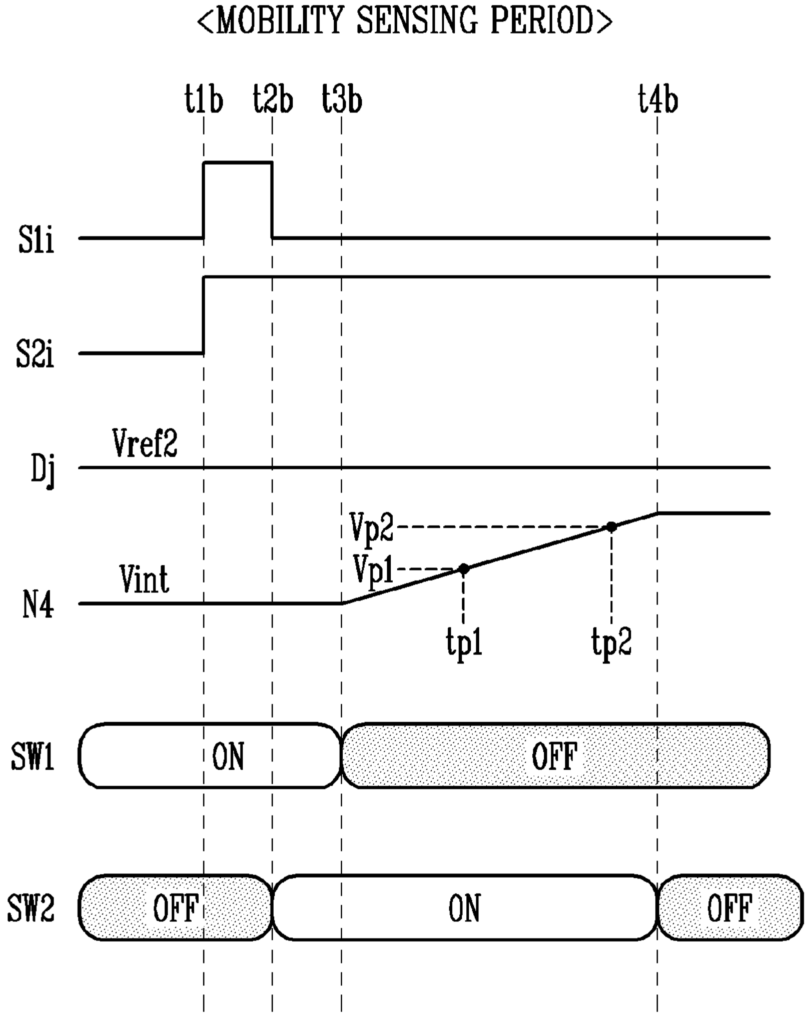
FIG. 5 is a diagram illustrating a mobility sensing period according to an embodiment of the disclosure.

FIG. 5 is a diagram illustrating a mobility sensing period according to an embodiment of the disclosure.

At a first time point t1*b* in the mobility sensing period, the turn-on level of first scan signal may be applied to the first scan line S1*i* and the turn-on level of second scan signal may be applied to the second scan line S2*i*. At the first time point t1*b*, since a second reference voltage Vref2 is applied to the data line Dj, the second reference voltage Vref2 may be applied to the first node N1. In addition, since the first switch SW1 is in a turn-on state, the initialization voltage Vint may be applied to the second node N2 and the third node N3. Accordingly, the first transistor T1 may be turned on in response to the difference between the gate voltage and the source voltage.

At a second time point t2*b* in the mobility sensing period, as the turn-off level of first scan signal is applied to the first scan line S1*i*, the first node N1 may be in a floating state, and the initialization voltage Vint may be applied to the fourth node N4 as the second switch SW2 is turned on.

At a third time point t3*b* in the mobility sensing period, the first switch SW1 may be turned off. Accordingly, as a current is supplied from the first power line ELVDD through the first transistor T1, a voltage of the second, third, and fourth nodes N2, N3, and N4 increases. At the third time point t3*b*, since the first node N1 is in the floating state, a gate-source voltage difference of the first transistor T1 may be maintained.

At a fourth time point t4*b* in the mobility sensing period, the second switch SW2 may be turned off. Accordingly, the sensing voltage is stored in the first electrode of the sensing capacitor Css. A sensing current of the first transistor T1 may be obtained using Equation 1 below.

$$I=C^*(Vp2-Vp1)/(tp2-tp1) \quad \text{[Equation 1]}$$

In Equation 1, I denotes the sensing current of the first transistor T1, C denotes a capacitance of the sensing capacitor Css, Vp2 denotes the sensing voltage at the time point tp1, and Vp1 denotes the sensing voltage at the time point tp2.

Assuming that a voltage slope of the fourth node N4 between the time point t3*b* and the time point t4*b* is linear, since the sensing voltage at the time point t3*b* and the sensing voltage at the time point t4*b* may be known, the sensing current of the first transistor T1 may be calculated. In addition, mobility of the first transistor T1 may be calculated using the calculated sensing current. In an embodiment, for example, the greater the sensing current is, the greater the mobility is. In an embodiment, for example, a magnitude of the mobility may be proportional to a magnitude of the sensing current.

Figure 6:
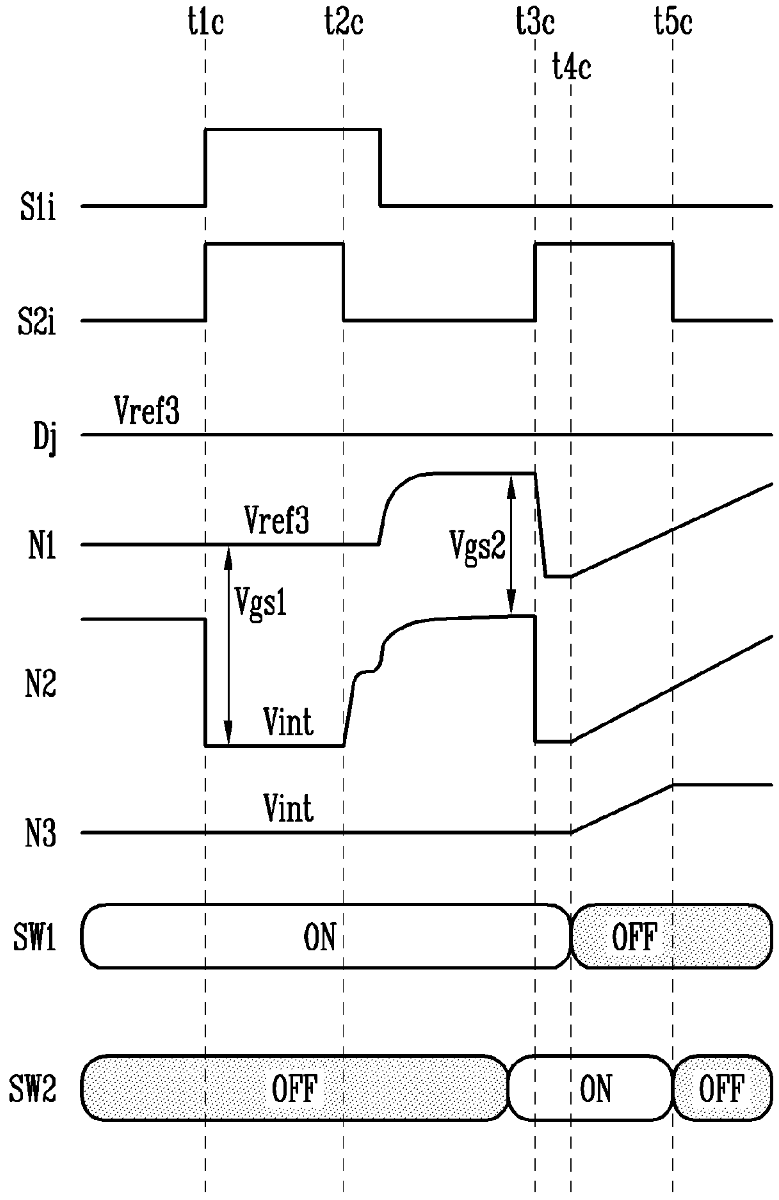
FIG. 6 is a diagram illustrating a threshold voltage sensing period of a light emitting diode according to an embodiment of the disclosure.

FIG. 6 is a diagram illustrating a threshold voltage sensing period of a light emitting diode according to an embodiment of the disclosure.

At a first time point t1*c* in the threshold voltage sensing period, the turn-on level of first scan signal may be applied to the first scan line S1*i* and the turn-on level of second scan signal may be applied to the second scan line S2*i*. At the first time point t1*c* in the threshold voltage sensing period, since a third reference voltage Vref3 is applied to the data line Dj, the third reference voltage Vref3 may be applied to the first node N1. At the first time point t1*c*, since the first switch SW1 is in a turn-on state, the initialization voltage Vint may be applied to the second node N2 and the third node N3. Therefore, the first transistor T1 may be turned on in response to a gate-source voltage Vgs1.

At a second time point t2*c* in the threshold voltage sensing period, the turn-off level of second scan signal may be applied to the second scan line S2*i*. In addition, at the second time point t2*c* or immediately after the second time point t2*c*, the turn-off level of first scan signal may be applied to the first scan line S1*i*. At the second time point t2*c*, the voltage of the second node N2 increases by the current supplied from the first power line ELVDD, and the voltage of the first node N1 coupled to the second node N2 and in a floating state also increases. At the second time point t2*c*, the voltage of the second node N2 is saturated to a voltage corresponding to a threshold voltage of the light emitting diode LD. As a deterioration degree of the light emitting diode LD increases, the saturated voltage of the second node N2 may increase. A gate-source voltage Vgs2 of the first transistor T1 may be reset by the saturated voltage of the second node N2. In an embodiment, for example, the reset gate-source voltage Vgs2 may be less than the preset gate-source voltage Vgs1.

At a third time point t3*c* in the threshold voltage sensing period, the turn-on level of second scan signal may be applied to the second scan line S2*i*. Accordingly, the initialization voltage Vint may be applied to the second node N2. At the third time point t3*c*, the reset gate-source voltage Vgs2 may be maintained by the storage capacitor Cst.

At a fourth time point t4*c* in the threshold voltage sensing period, the first switch SW1 may be turned off. At the fourth time point t4*c*, since the second switch SW2 is in a turn-on state, the voltage of the second node N2, the third node N3, and the fourth node N4 may increase. As the deterioration degree of the light emitting diode LD (or the threshold voltage of the light emitting diode LD) increases, a voltage increase slope may decrease.

At a fifth time point t5*c* in the threshold voltage sensing period, the turn-off level of second scan signal may be applied to the second scan line S2*i*, and the second switch SW may be turned off. Accordingly, the threshold voltage of the light emitting diode LD may be calculated using the sensing voltage stored in the sensing capacitor Css.

Figure 7:
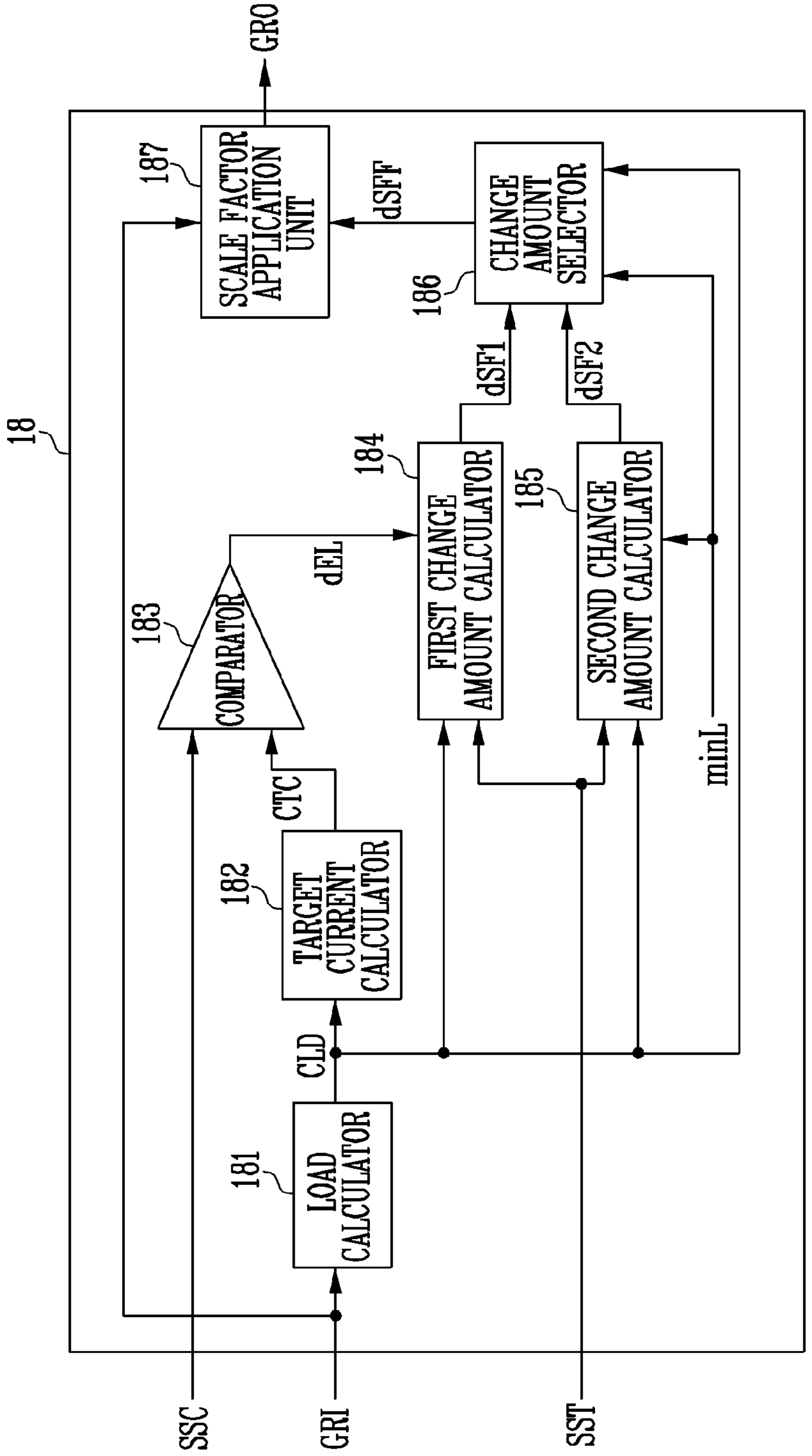
FIG. 7 is a diagram illustrating a grayscale converter according to an embodiment of the disclosure.
Figure 8:
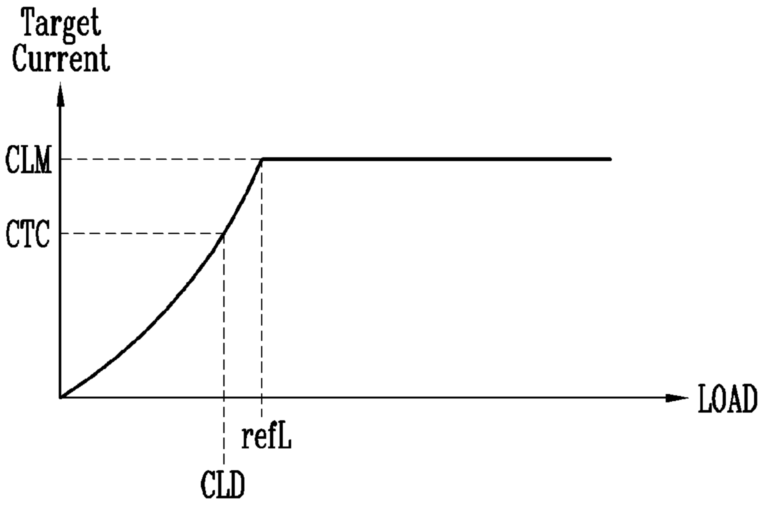
FIG. 8 is a diagram illustrating a target current calculator according to an embodiment of the disclosure.
Figure 9:
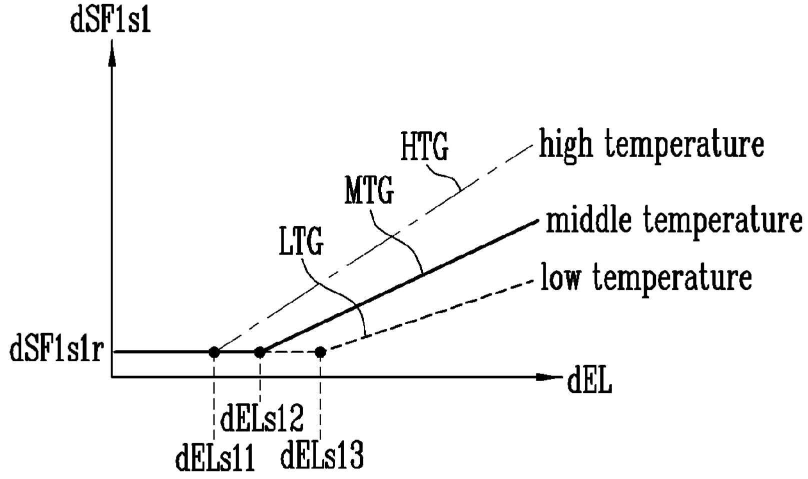
FIGS. 9 to 11 are diagrams illustrating a first change amount calculator according to an embodiment of the disclosure.
Figure 10:
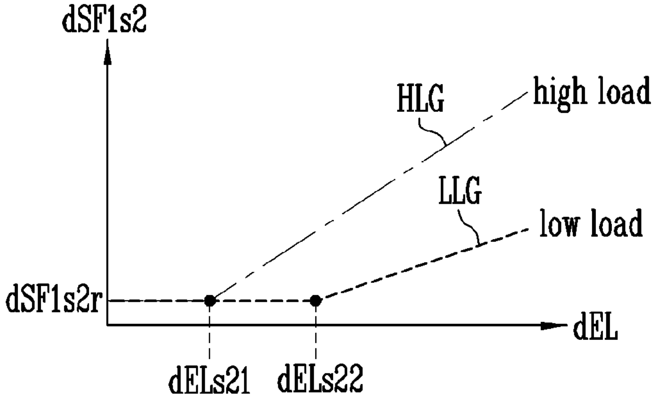
Figure 11:
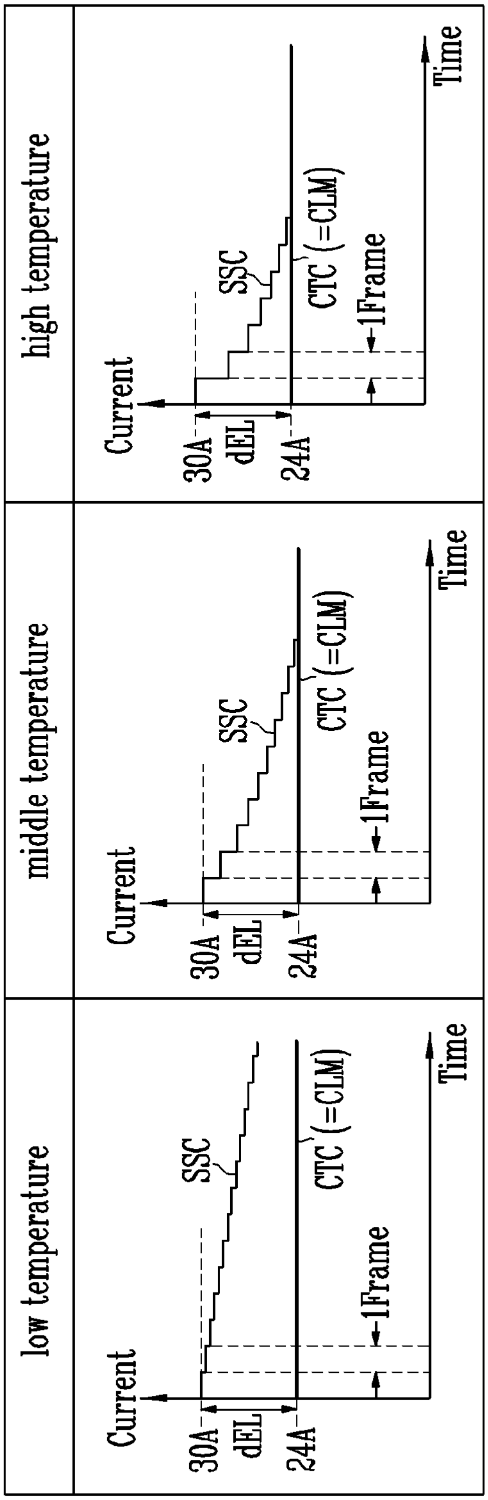
Figure 12:
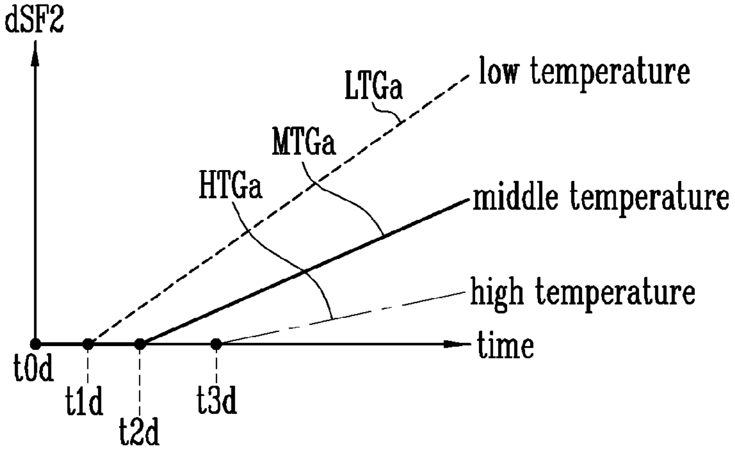
FIGS. 12 and 13 are diagrams illustrating a second change amount calculator according to an embodiment of the disclosure.
Figure 13:
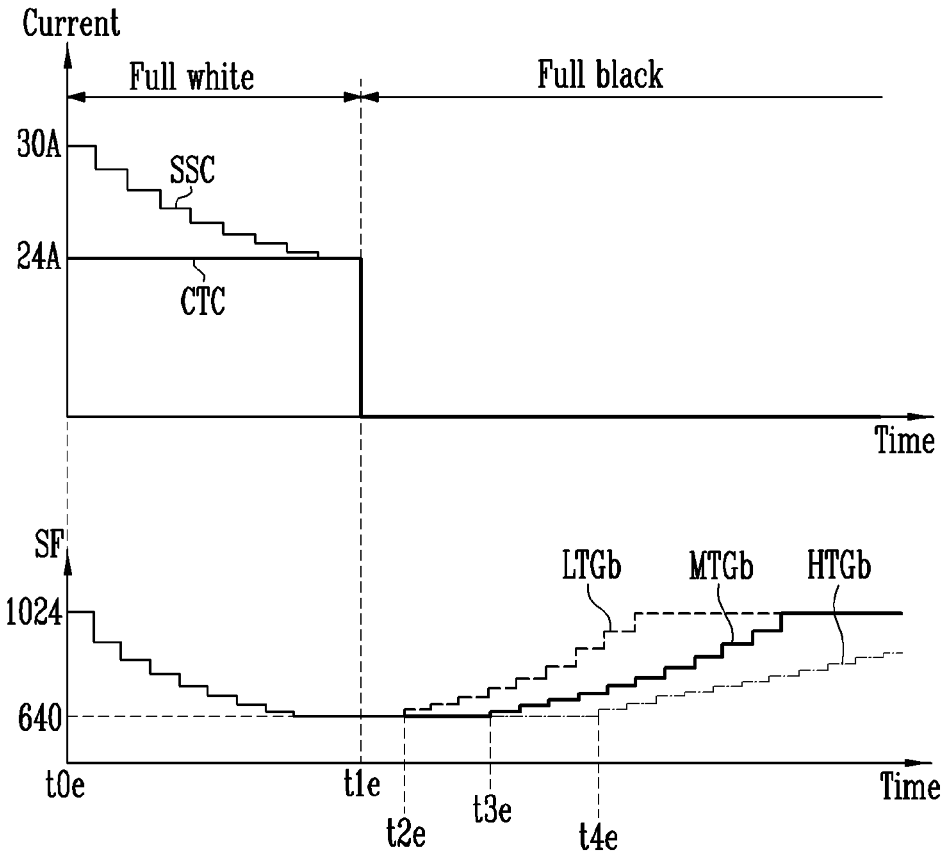
Figure 14:
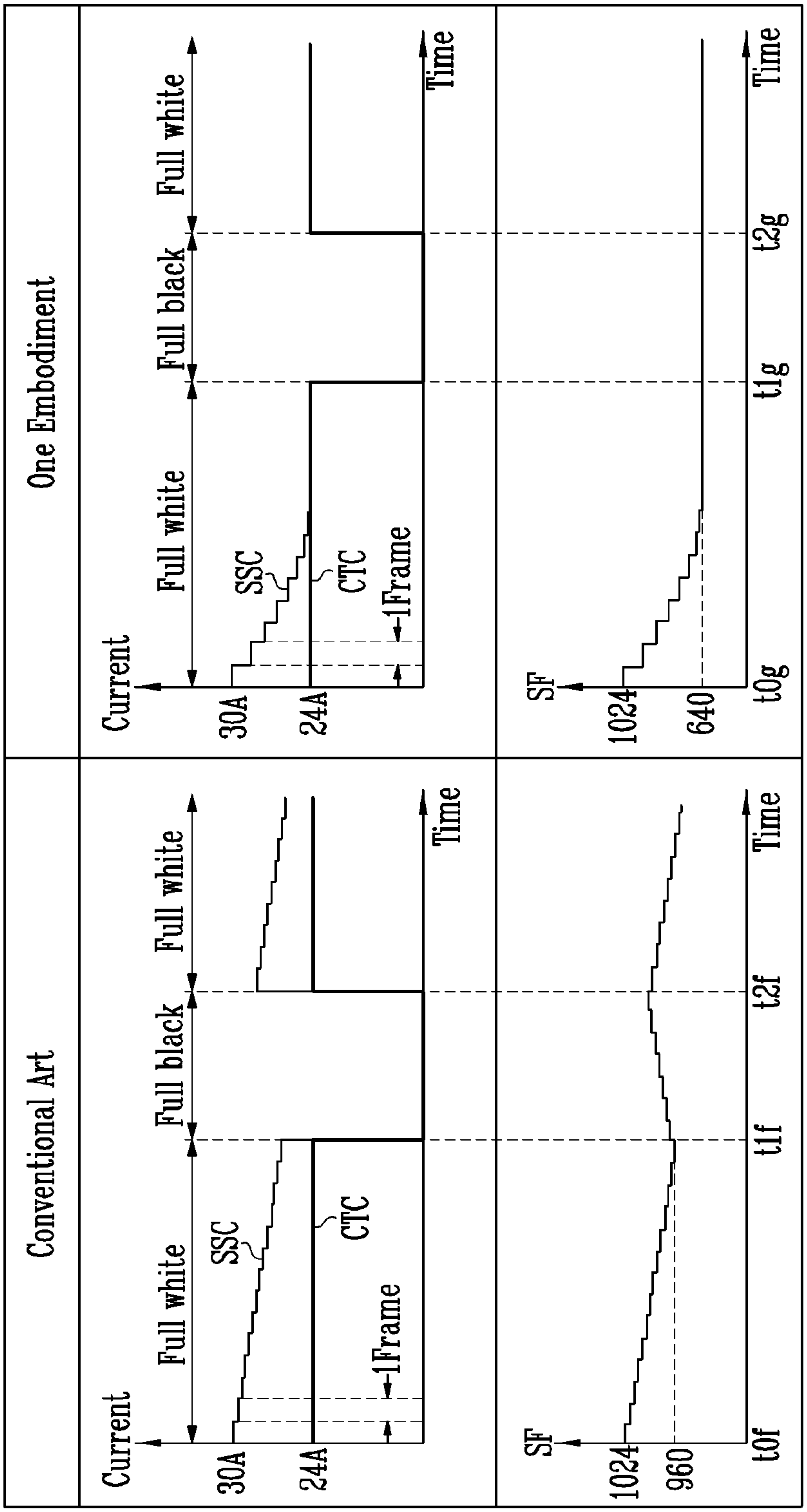
FIG. 14 is a diagram illustrating operations of the conventional art and an embodiment of the disclosure.

FIG. 7 is a diagram illustrating a grayscale converter according to an embodiment of the disclosure. FIG. 8 is a diagram illustrating a target current calculator according to an embodiment of the disclosure. FIGS. 9 to 11 are diagrams illustrating a first change amount calculator according to an embodiment of the disclosure. FIGS. 12 and 13 are diagrams illustrating a second change amount calculator according to an embodiment of the disclosure. FIG. 14 is a diagram illustrating operations of the conventional art and an embodiment of the disclosure.

In an embodiment, as described above, when a load CLD corresponding to the input grayscales GRI is greater than a minimum load minL, the grayscale converter 18 may adjust a change amount dSFF of a scale factor based on a current difference dEL between a target current CTC corresponding to the load CLD and the sensing current SSC. In an embodiment, when the load CLD is greater than the minimum load minL, the grayscale converter 18 may adjust the change amount dSFF of the scale factor to be increased as the current difference dEL increases (refer to FIGS. 9 and 10). Here, a magnitude of the change amount dSFF may be an absolute value. In an embodiment, when the load CLD is greater than the minimum load minL, the grayscale converter 18 may adjust the change amount dSFF of the scale factor corresponding to the current difference dEL to be increased as the load CLD increases (refer to FIG. 10). In an embodiment, when the load CLD is greater than the minimum load minL, the grayscale converter 18 may adjust the change amount dSFF of the scale factor corresponding to the current difference dEL to be increased as the sensing temperature SST increases (refer to FIG. 9). In an embodiment, when the load CLD is less than the minimum load minL, the grayscale converter 18 may adjust the change amount dSFF of the scale factor corresponding to a time to be increased as the sensing temperature SST increases (refer to FIG. 12).

FIG. 7 shows a configuration of an embodiment of the grayscale converter 18 for exhibiting the above-described function. In an embodiment, the grayscale converter 18 may include a load calculator 181, a target current calculator 182, a comparator 183, a first change amount calculator 184, a second change amount calculator 185, a change amount selector 186, and a scale factor application unit 187.

The load calculator 181 may calculate the load CLD corresponding to a sum of the input grayscales GRI. In an embodiment, for example, the load CLD at one time point may be the sum of the input grayscales GRI of one frame. In an embodiment, the load CLD at one time point may be a sum of gamma conversion values of the input grayscales GRI of one frame. The gamma conversion values refer to values obtained by converting input the grayscales GRI into a luminance domain according to a selected gamma value. In an embodiment, for example, the gamma value may be 2.0, 2.2, 2.4, or the like, and may be selected by a user or an algorithm.

The target current calculator 182 may provide the target current CTC corresponding to the load CLD. In such an embodiment, the target current CTC may be less than or equal to a limit current CLM (refer to FIG. 8). Referring to FIG. 8, when the load CLD is less than a reference load refL, the target current calculator 182 may also increase the target current CTC as the load CLD increases. When the load CLD corresponds to the reference load refL, the target current calculator 182 may set the target current CTC as the limit current CLM. In such an embodiment, when the load CLD is greater than the reference load refL, the target current calculator 182 may maintain the target current CTC as the limit current CLM even though the load CLD increases. Therefore, an abnormal overcurrent may be effectively prevented from flowing through the display device 10 due to a temperature increase or the like.

Referring back to FIG. 7, the comparator 183 may receive the target current CTC and the sensing current SSC and output the current difference dEL. In an embodiment, for example, the comparator 183 may output a value obtained by subtracting the target current CTC from the sensing current SSC as the current difference dEL. In an embodiment, when the sensing current SSC is greater than the target current CTC, the current difference dEL may be positive, and when the sensing current SSC is less than the target current CTC, the current difference dEL may be negative. In an alternative embodiment, the comparator 183 may output a value obtained by subtracting the sensing current SSC from the target current CTC as the current difference dEL.

The first change amount calculator 184 may calculate a first change amount dSF1 for the scale factor based on the current difference dEL, the load CLD, and the sensing temperature SST. In an embodiment, for example, the first change amount calculator 184 may calculate a negative first change amount dSF1 when the current difference dEL is positive, and calculate a positive first change amount dSF1 when the current difference dEL is negative.

In FIG. 9, a graph HTG of a case where the sensing temperature SST corresponds to a high temperature, a graph MTG of a case where the sensing temperature SST corresponds to a middle temperature (for example, a room temperature), and a graph LTG of a case where the sensing temperature SST corresponds to a low temperature are illustrated. The number of the graphs HTG, MTG, and LTG may increase or decrease according to a specification of the display device 10. Hereinafter, such a description is omitted.

Referring to FIG. 9, the first change amount calculator 184 may adjust a first change amount dSF1*s*1 to be increased as the current difference dEL increases. In all of the graphs HTG, MTG, and LTG, when the current difference dEL is greater than a corresponding one of reference current differences dELs11, dELs12, and dELs13 based on the sensing temperature SST, the first change amount dSF1*s*1 may increase as the current difference dEL increases.

In such an embodiment, the first change amount calculator 184 may adjust the first change amount dSF1*s*1 of the scale factor corresponding to the current difference dEL to be increased as the sensing temperature SST increases. In an embodiment, for example, when the current difference dEL is greater than the reference current difference dELs13, with respect to the same current difference dEL, the lowest first change amount dSF1*s*1 may be calculated in a case of the low temperature, and the highest first change amount dSF1*s*1 may be calculated in a case of the high temperature.

With respect to a current difference dEL less than the reference current difference dELs11, the first change amount dSF1*s*1 may be fixed as a first reference change amount dSF1*s*1*r*. Therefore, excessively frequent fluctuation of the change amount may be effectively prevented. The first reference change amount dSF1*s*1*r* may be greater than 0. In an embodiment, the reference current difference dELs13 of the graph LTG may be the largest and the reference current difference dELs11 of the graph HTG may be the smallest. This is because the scale factor is desired to be changed more quickly to prevent an overcurrent in a case of the high temperature.

In an embodiment, a slope of the graph LTG after the reference current difference dELs11 may be the smallest and a slope of the graph HTG after the reference current difference dELs13 may be the largest. This reflects a fact that a temperature increase slope of the display panel over time increases as the ambient temperature increases.

In FIG. 10, a graph HLG of a case where the load CLD is relatively large and a graph LLG of a case where the load CLD is relatively small are illustrated.

Referring to FIG. 10, the first change amount calculator 184 may adjust a first change amount dSF1*s*2 to be increased as the current difference dEL increases. In all of the graphs HLG and LLG, when the current difference dEL is greater than each of reference current differences dELs21 and dELs22, the first change amount dSF1*s*2 may increase as the current difference dEL increases.

The first change amount calculator 184 may adjust the first change amount dSF1*s*2 corresponding to the current difference dEL to be increased as the load CLD increases. In an embodiment, for example, when the current difference dEL is greater than the reference current difference dELs22, with respect to the same current difference dEL, a low first change amount dSF1*s*2 may be calculated in a case of the low load CLD (LLG), and a high first change amount dSF1*s*2 may be calculated in a case of the high load CLD.

With respect to the current difference dEL less than the reference current difference dELs21, the first change amount dSF1*s*2 may be fixed as a first reference change amount dSF1*s*2*r*. Therefore, excessively frequent fluctuation of the change amount may be effectively prevented. The first reference change amount dSF1*s*2*r* may be greater than 0. In an embodiment, the reference current difference dELs22 of the graph LLG may be relatively large and the reference current difference dELs21 of the graph HLG may be relatively small. This is because the scale factor is desired to be changed more quickly to prevent an overcurrent in a case of the high load CLD (HLG).

In an embodiment, a slope of the graph LLG may be relatively small and a slope of the graph HLG may be relatively large after the reference current difference dELs22. This reflects a fact that the temperature increase slope of the display panel over time increases as the load increases.

In an embodiment, the first change amount calculator 184 may output the first change amount dSF1*s*1 as the first change amount dSF1. In an alternative embodiment, the first change amount calculator 184 may output the first change amount dSF1*s*2 as the first change amount dSF1.

In another alternative embodiment, the first change amount calculator 184 may output a combination of the first change amount dSF1*s*1 and the first change amount dSF1*s*2 as the first change amount dSF1. In an embodiment, for example, the combination of the first change amount dSF1*s*1 and the first change amount dSF1*s*2 may mean a sum of the first change amount dSF1*s*1 and the first change amount dSF1*s*2. In an embodiment, for example, the combination of the first change amount dSF1*s*1 and the first change amount dSF1*s*2 may mean one coordinate of a three-dimensional graph in which the current difference dEL is an x-axis, the first change amount dSF1*s*1 is a y-axis, and the first change amount dSFs2 is a z-axis. In an embodiment, for example, the combination of the first change amount dSF1*s*1 and the first change amount dSF1*s*2 may mean a value obtained by applying different weighted values to the first change amount dSF1*s*1 and the first change amount dSF1*s*2, respectively, and then adding them. In such an embodiment, as described above, the combination of the first change amount dSF1*s*1 and the first change amount dSF1*s*2 may be variously set through the existing algorithm.

The first change amount calculator 184 may include a look-up-table (LUT) corresponding to the above-described content. In an embodiment, for example, an input variable of the LUT may be the current difference dEL, the load CLD, and the sensing temperature SST, and an output variable may be the first change amount dSF1.

In FIG. 11, an operation of the first change amount calculator 184 according to the ambient temperature is illustrated. Referring to FIG. 11, as the ambient temperature increases, a speed at which the sensing current SSC converges to the target current CTC may increase. Therefore, an overcurrent may be effectively prevented from flowing through the display device 10 at a high temperature. In an embodiment, for example, a unit time when the grayscale converter 18 operates may be one frame.

When the load CLD is less than the minimum load minL, the second change amount calculator 185 may calculate a second change amount dSF2 for the scale factor based on the load CLD and the sensing temperature SST. The second change amount dSF2 may be 0 or a positive number.

In FIG. 12, a graph HTGa of a case where the sensing temperature SST corresponds to a high temperature, a graph MTGa of a case where the sensing temperature SST corresponds to a middle temperature (for example, a room temperature), and a graph LTGa of a case where the sensing temperature SST corresponds to a low temperature are illustrated.

Referring to FIG. 12, the second change amount calculator 185 may adjust the second change amount dSF2 to be increased as an operation time increases. An initial time point when the load CLD is less than the minimum load minL is set as a reference time point t0*d* of an operation time. A time elapsed from the reference time point t0*d* is referred to as an operation time of the second change amount calculator 185. In all the graphs LTGa, MTGa, and HTGa, when a time point is greater than a corresponding one of reference time points t1*d*, t2*d*, and t3*d*, the second change amount dSF2 may increase as the operation time increases.

In an embodiment, when the load CLD is less than the minimum load minL, the second change amount calculator 185 may adjust the second change amount dSF2 corresponding to the operation time to be increased as the sensing temperature SST increases.

In an embodiment, for example, when the time point is after the reference time point t3*d*, with respect to the same operation time, the lowest second change amount dSF2 may be calculated at the high temperature, and the highest second change amount dSF2 may be calculated at the low temperature.

With respect to an operation time shorter than the reference time point t1*d*, the second change amount dSF2 may be fixed. Therefore, excessively frequent fluctuation of the change amount may effectively be prevented. In an embodiment, the second change amount dSF2 may be fixed to 0. In an embodiment, the reference time t3*d* of the graph HTGa may be the latest, and the reference time t2*d* of the graph LTGa may be the earliest. This is because a case where the second change amount calculator 185 operates is a case where a low grayscale image (for example, a black image) is displayed, a time point when a temperature of the display panel decreases is late even though the low grayscale image is displayed as the ambient temperature increases.

In an embodiment, a slope of the graph HTGa may be the smallest and a slope of the graph LTGa may be the largest after the reference time point t3*d*. This reflects a fact that a slope at which the temperature of the display panel decreases is small even though the low grayscale image is displayed as the ambient temperature increases.

The second change amount calculator 185 may include an LUT corresponding to the above-described content. In an embodiment, for example, an input variable of the LUT may be the load CLD and the sensing temperature SST, and an output variable may be the second change amount dSF2.

In FIG. 13, an operation of the second change amount calculator 185 according to the ambient temperature is illustrated. In FIG. 13, a case in which a full white image is displayed during a first period t0*e* to t1*e* and a full black image is displayed during a second period t1*e* to thereafter is illustrated. During the first period t0*e* to t1*e*, the first change amount dSF1 of the first change amount calculator 184 may be selected as the change amount dSFF of the scale factor SF, and during the second period t1*e* to thereafter, the second change amount dSF2 of the second change amount calculator 185 may be selected as the change amount dSFF of the scale factor SF (an operation of the change amount selector 186 is described later).

In an embodiment, for example, the scale factor SF may decrease from 1024 to 640 during the first period t0*e* to t1*e*. When the sensing current SSC and the target current CTC become equal to each other, the scale factor SF may be maintained as 640.

When the ambient temperature is low (LTGb), the scale factor SF may increase from a time point t2*e* during the second period t1*e* to thereafter. The time point t2*e* may correspond to the reference time point t1*d* of the graph LTGa of FIG. 12. When the ambient temperature is the middle temperature (MTGb), the scale factor SF may increase from a time point t3*e* during the second period t1*e* to thereafter. The time point t3*e* may correspond to the reference time point t2*d* of the graph MTGa of FIG. 12. When the ambient temperature is high (HTGb), the scale factor SF may increase from a time point t4*e* during the second period t1*e* to thereafter. The time point t4*e* may correspond to the reference time point t3*d* of the graph HTGa of FIG. 12.

Referring to FIG. 14, an embodiment of the disclosure and the conventional art are compared with each other in a case where a full white image is displayed during first periods t0*f* to t1*f* and t0*g* to t1*g*, a full black image is displayed during second periods t1*f* to t2*f* and t1*g* to t2*g*, and a full white image is displayed during third periods t2*f* to thereafter and t2*g* to thereafter. An alternate display of the full white image and the full black image may be a worst case of the display device 10.

Referring to the conventional art (left graphs) in FIG. 14, the scale factor SF increases/decreases with the same change amount. For example, the scale factor SF may increase/decrease with a change amount of 1 (or 1 bit) for each one frame. For example, the scale factor SF decreases during the first period t0*f* to t1*f*, increases during the second period t1*f* to t2*f*, and decreases during the third period t2*f* to thereafter. At this time, the sensing current SSC may not converge to the target current CTC during the first period t0*f* to t1*f* and the sensing current SSC becomes higher than the target current CTC at a time point t2*f*. Periods in which the sensing current SSC is higher than the target current CTC are periods in which an overcurrent flows, and are not preferable.

Referring to an embodiment of the disclosure (right graphs) in FIG. 14, the sensing current SSC may rapidly converge to the target current CTC before an end time point t1*g* of the first period t0*g* to t1*g*. In addition, an overcurrent may not occur in the third period t2*g* to thereafter.

The change amount selector 186 may select the first change amount dSF1 as the change amount dSFF when the load CLD is greater than the minimum load minL, and select the second change amount dSF2 as the change amount dSFF when the load CLD is less than the minimum load minL.

The scale factor application unit 187 may generate the output grayscales GRO by applying the scale factor SF to which the change amount dSFF is applied to the input grayscales GRI (refer to FIG. 14). The scale factor SF may have a range of a minimum value to a maximum value. In an embodiment, for example, the minimum value of the scale factor SF may be 0, and the maximum value may be 1024 (or 1024 bits). In an embodiment, for example, the output grayscales GRO may be calculated using Equation 2 below.

$$GROe=GRIe\times(SF/SFMAX) \quad \text{[Equation 2]}$$

Here, GRIe denotes an input grayscale corresponding to one pixel among the input grayscales GRI configuring an image, GROe denotes an output grayscale corresponding to the pixel to which GRIe is converted, SF denotes the scale factor, and SFMAX denotes the maximum value of the scale factor (for example, 1024).

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a grayscale converter which converts input grayscales into output grayscales based on a scale factor;

a data driver which converts the output grayscales into data voltages;

a plurality of pixels which receives the data voltages and displays an image based on the data voltages;

a current sensor which provides a sensing current by sensing a first power current supplied to all of the plurality of pixels during a same period to display the image; and a temperature sensor which provides a sensing temperature to the grayscale converter, wherein when a load corresponding to the input grayscales is greater than a minimum load, the grayscale converter adjusts a change amount of the scale factor based on a current difference between a target current corresponding to the load and the sensing current, wherein when the load is greater than the minimum load, the grayscale converter adjusts the change amount of the scale factor corresponding to the current difference to be increased as the sensing temperature increases, and wherein when the load is less than the minimum load, the grayscale converter adjusts the change amount of the scale factor corresponding to a time to be decreased as the sensing temperature increases.

2. The display device according to claim 1, wherein when the load is greater than the minimum load, the grayscale converter adjusts the change amount of the scale factor to be increased as the current difference increases.

3. The display device according to claim 2, wherein when the load is greater than the minimum load, the grayscale converter adjusts the change amount of the scale factor corresponding to the current difference to be increased as the load increases.

4. The display device according to claim 1, wherein the grayscale converter comprises a load calculator which calculates the load corresponding to a sum of the input grayscales.

5. The display device according to claim 4, wherein the grayscale converter comprises a target current calculator which provides the target current corresponding to the load, and the target current is less than or equal to a limit current.

6. The display device according to claim 5, wherein the grayscale converter comprises a comparator which receives the target current and the sensing current and outputs the current difference.

7. The display device according to claim 6, wherein the grayscale converter further comprises a first change amount calculator which calculates a first change amount with respect to the scale factor based on the current difference, the load, and the sensing temperature.

8. The display device according to claim 7, wherein the grayscale converter further comprises a second change amount calculator which calculates a second change amount with respect to the scale factor based on the load and the sensing temperature, when the load is less than the minimum load.

9. The display device according to claim 8, wherein the grayscale converter further comprises a change amount selector which selects the first change amount as the change amount when the load is greater than the minimum load, and selects the second change amount as the change amount when the load is less than the minimum load.

10. The display device according to claim 9, wherein the grayscale converter further comprises a scale factor application unit which generates the output grayscales by applying the scale factor, to which the change amount is applied, to the input grayscales.

11. A method of driving a display device, the method comprising:

converting input grayscales into output grayscales based on a scale factor;

converting the output grayscales into data voltages;

displaying an image based on the data voltages; and providing a sensing current by sensing a first power current supplied to all of a plurality of pixels of the display device during a same period to display the image, wherein the converting the input grayscales into the output grayscales comprises adjusting a change amount of the scale factor based on a current difference between a target current corresponding to a load and the sensing current when the load corresponding to the input grayscales is greater than a minimum load, wherein the adjusting the change amount of the scale factor further comprises adjusting the change amount of the scale factor corresponding to the current difference to be increased as a sensing temperature increases when the load is greater than the minimum load, and wherein the adjusting the change amount of the scale factor further comprises adjusting the change amount of the scale factor corresponding to a time to be decreased as the sensing temperature increases when the load is less than the minimum load.

12. The method according to claim 11, wherein the adjusting the change amount of the scale factor comprises adjusting the change amount of the scale factor to be increased as the current difference increases when the load is greater than the minimum load.

13. The method according to claim 12, wherein the adjusting the change amount of the scale factor further comprises adjusting the change amount of the scale factor corresponding to the current difference to be increased as the load increases when the load is greater than the minimum load.

14. The method according to claim 11, wherein the load corresponds to a sum of the input grayscales.

15. The method according to claim 11, wherein the target current is less than or equal to a limit current.

16. The method according to claim 11, wherein the adjusting the change amount of the scale factor comprises selecting a first change amount as the change amount when the load is greater than the minimum load, and selecting a second change amount different from the first change amount as the change amount when the load is less than the minimum load.

* * * * *